(12) United States Patent
Kusumi et al.

(10) Patent No.: US 9,937,801 B2
(45) Date of Patent: Apr. 10, 2018

(54) ELECTRIC MOTOR VEHICLE AND BATTERY PACK

(71) Applicants: TOYOTA JIDOSHA KABUSHIKI KAISHA, Toyota-shi, Aichi-ken (JP); KABUSHIKI KAISHA TOYOTA JIDOSHOKKI, Kariya-shi, Aichi-ken (JP)

(72) Inventors: Hidetoshi Kusumi, Nagoya (JP); Ikkei Ohgitani, Obu (JP)

(73) Assignees: TOYOTA JIDOSHA KABUSHIKI KAISHA, Aichi-ken (JP); KABUSHIKI KAISHA TOYOTA JIDOSHOKKI, Aichi-ken (JP)

(*) Notice: Subject to any disclaimer, the term of this patent is extended or adjusted under 35 U.S.C. 154(b) by 0 days.

(21) Appl. No.: 15/160,510

(22) Filed: May 20, 2016

(65) Prior Publication Data
US 2016/0347183 A1    Dec. 1, 2016

(30) Foreign Application Priority Data

May 25, 2015 (JP) .................................. 2015-105848

(51) Int. Cl.
*B60L 11/00*    (2006.01)
*B60K 1/04*    (2006.01)
(Continued)

(52) U.S. Cl.
CPC ................ *B60L 11/00* (2013.01); *B60K 1/04* (2013.01); *B60L 11/1877* (2013.01);
(Continued)

(58) Field of Classification Search
CPC .............. B60L 11/1877; B60L 11/1851; B60L 11/1853; H01M 2/1077; H01M 2/1083; B60K 2001/0438
See application file for complete search history.

(56) References Cited

U.S. PATENT DOCUMENTS 9,004,208 B2    4/2015    Seibert et al.
9,136,783 B2 *  9/2015    Mitsutani ................ B60L 11/18
(Continued)

FOREIGN PATENT DOCUMENTS

CN    102887054 A    1/2013
JP    2013247774 A    12/2013
(Continued)

OTHER PUBLICATIONS

U.S. Appl. No. 15/161,865 filed May 23, 2016 to Hidetoshi Kusumi and Ikkei Ohgitani.

*Primary Examiner* — Brian L Swenson
(74) *Attorney, Agent, or Firm* — Sughrue Mion, PLLC

(57) ABSTRACT

An electric motor vehicle including: a high-output assembled battery; a high-capacity assembled battery having a larger capacity and a smaller output than those of the high-output assembled battery; and an inverter, and the electric motor vehicle is equipped with a PCU that transmits and receives electric power to and from the high-output assembled battery and the high-capacity assembled battery, a first wiring that connects the high-output assembled battery to the PCU, and a second wiring that connects the high-capacity assembled battery to the PCU, and is shorter than the first wiring.

4 Claims, 10 Drawing Sheets

(51) Int. Cl.
  *B60L 11/18*   (2006.01)
  *H01M 2/10*   (2006.01)
  *H01M 10/42*   (2006.01)

(52) U.S. Cl.
  CPC ....... *H01M 2/1077* (2013.01); *H01M 10/425* (2013.01); *B60K 2001/0438* (2013.01); *H01M 2010/4271* (2013.01); *H01M 2220/20* (2013.01); *Y02T 10/7005* (2013.01); *Y02T 10/705* (2013.01)

(56) References Cited

U.S. PATENT DOCUMENTS

| | | | |
|---|---|---|---|
| 2012/0025744 A1* | 2/2012 | Kim | B60L 11/1853 318/139 |
| 2012/0312610 A1* | 12/2012 | Kim | H01M 2/1077 180/65.31 |
| 2013/0020139 A1* | 1/2013 | Kim | B60K 1/04 180/68.5 |
| 2013/0038127 A1 | 2/2013 | King et al. | |
| 2013/0220716 A1 | 8/2013 | Favaretto | |
| 2013/0264975 A1* | 10/2013 | Kaita | B60L 11/1853 318/139 |
| 2014/0151138 A1* | 6/2014 | Kitami | B60L 3/04 180/65.21 |
| 2014/0210209 A1 | 7/2014 | Nakayama et al. | |
| 2015/0097425 A1 | 4/2015 | Kimura et al. | |
| 2015/0273995 A1* | 10/2015 | Muto | B60L 7/14 180/68.5 |

FOREIGN PATENT DOCUMENTS

| | | |
|---|---|---|
| JP | 5679063 B2 | 3/2015 |
| WO | 2013030882 A1 | 3/2013 |
| WO | 2013/157049 A1 | 10/2013 |

* cited by examiner

ELECTRIC MOTOR VEHICLE AND BATTERY PACK

INCORPORATION BY REFERENCE

The disclosure of Japanese Patent Application No. 2015-105848 filed on May 25, 2015 including the specification, drawings and abstract is incorporated herein by reference in its entirety.

BACKGROUND OF THE INVENTION

1. Field of the Invention

The present invention relates to an electric motor vehicle equipped with plural batteries having different performances, and to a battery pack.

2. Description of Related Art

Electric motor vehicles, such as hybrid vehicles and electric vehicles, are equipped with rechargeable secondary batteries that output electric power for driving rotary electric machines, and store electric power generated by the rotary electric machines or electric power charged from an external electric power. Capacities, types, and performances, etc., of these vehicle-installed secondary batteries are determined depending on the specifications of the vehicles in which these secondary batteries are installed.

Recently, it has been proposed, for example, to install two or more types of batteries in a single electric motor vehicle for the purpose of enhancing performance of the electric motor vehicle, such as increase in cruising distance and increase in output torque. For example, International Publication No. 2013/157049 discloses a vehicle in which a high-output assembled battery and a high-capacity assembled battery are installed around a luggage space located at a rearward position in the vehicle.

SUMMARY OF THE INVENTION

In an electric motor vehicle equipped with two types of batteries: a high-capacity battery and a high-output battery, the high-capacity battery is mainly used, and the high-output battery is used if it is impossible to satisfy a request from a driver only using output from the high-capacity battery. In this case, in whole electric power transmitted and received by a power control unit (referred to as a "PCU", hereinafter) configured by an inverter or a converter, a percentage of electric power transmitted and received between the PCU and the high-capacity battery is likely to be greater than a percentage of electric power transmitted and received between the PCU and the high-output battery. In such a case, in order to enhance fuel efficiency, it is important to reduce an electric power loss between the high-capacity battery frequently used and the PCU. Unfortunately, in related art including WO 2013/157049 A, no sufficient studies have been conducted on reduction in power transmission loss between such a frequently used battery and the PCU.

The present invention provides an electric motor vehicle and a battery pack capable of efficiently transmitting and receiving electric power.

An electric motor vehicle according to one aspect of the present invention includes a high-output battery; a high-capacity battery having a larger capacity and a smaller output than a capacity and an output of the high-output battery; an electric power controller that includes an inverter, and transmits and receives electric power to and from the high-output battery and the high-capacity battery; a first wiring that connects the high-output battery to the electric power controller; and a second wiring that connects the high-capacity battery to the electric power controller, and is shorter than the first wiring.

In the aspect, in electric power transmitted and received by the electric power controller, a percentage of electric power transmitted and received between the electric power controller and the high-capacity battery may be greater than a percentage of electric power transmitted and received between the electric power controller and the high-output battery. In another aspect, a location of the high-capacity battery may be closer to the electric power controller than a location of the high-output battery is. In this case, the electric power controller, the high-capacity battery, and the high-output battery may be disposed in this order in one direction.

In another aspect, the high-capacity battery and the high-output battery may be disposed under a floor panel of the vehicle while the high-capacity battery and the high-output battery are housed in an identical case. In this case, the electric power controller may be disposed more frontward than a vehicle cabin, and the high-capacity battery is disposed more frontward than the high-output battery in the case.

A battery pack according to another aspect of the present invention is a battery pack including batteries of two or more types, and the battery pack includes: a case; a high-output battery housed in the case; a high-capacity battery that is housed in the case, and has a larger capacity and a smaller output than a capacity and an output of the high-output battery; a connection terminal electrically connected to an electric power controller disposed outside the battery pack; a first internal wiring that connects the high-output battery to the connection terminal; and a second internal wiring that connects the high-capacity battery to the connection terminal, and is shorter than the first internal wiring.

According to the present invention, the wiring connected to the high-capacity battery that is frequently used is shorter than the wiring connected to the high-output battery, thereby reducing an electric power transmission loss between the high-capacity battery and the PCU. As a result, it is possible to more efficiently transmit and receive electric power.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
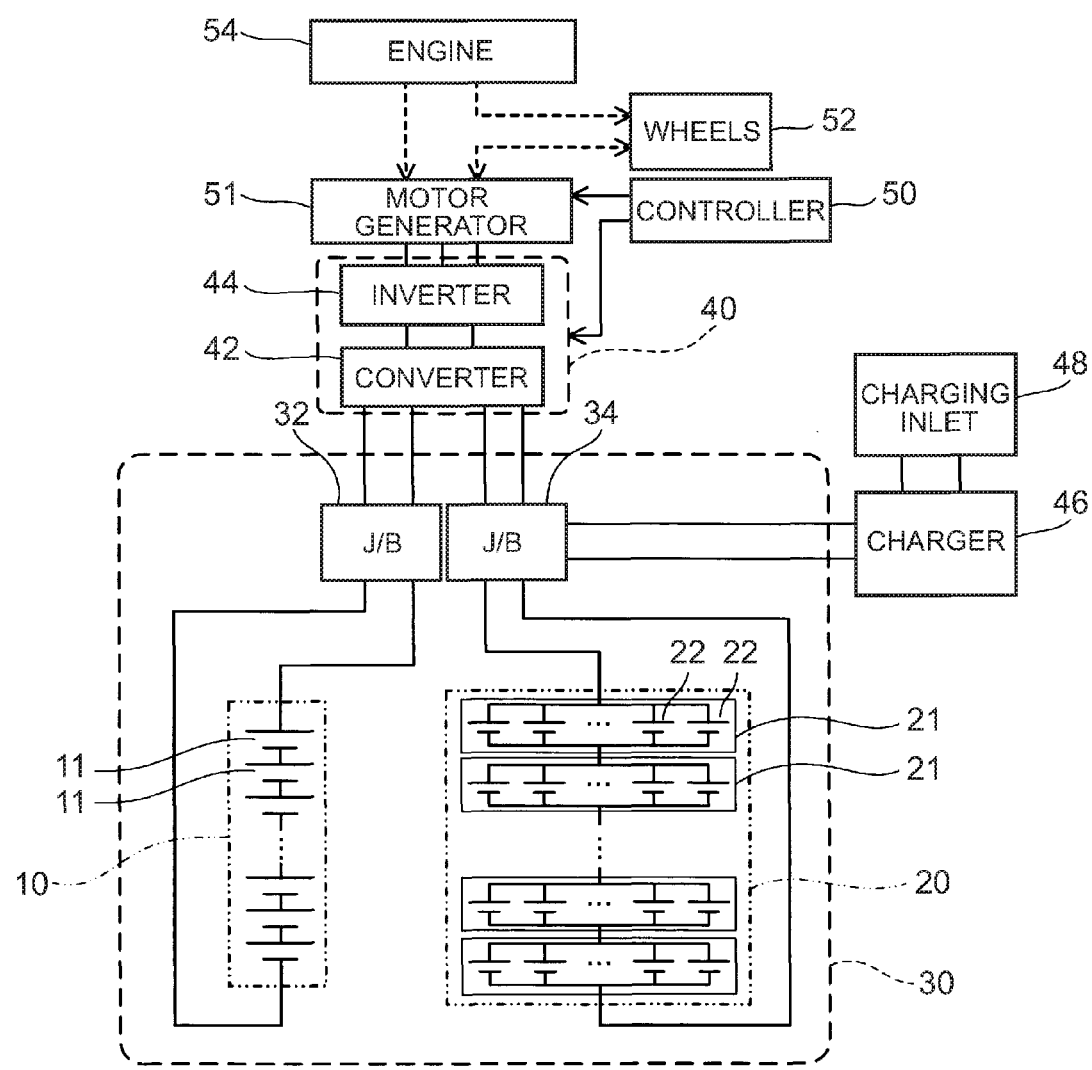
FIG. 1 is a drawing showing a configuration of a battery system.
Figure 2A:
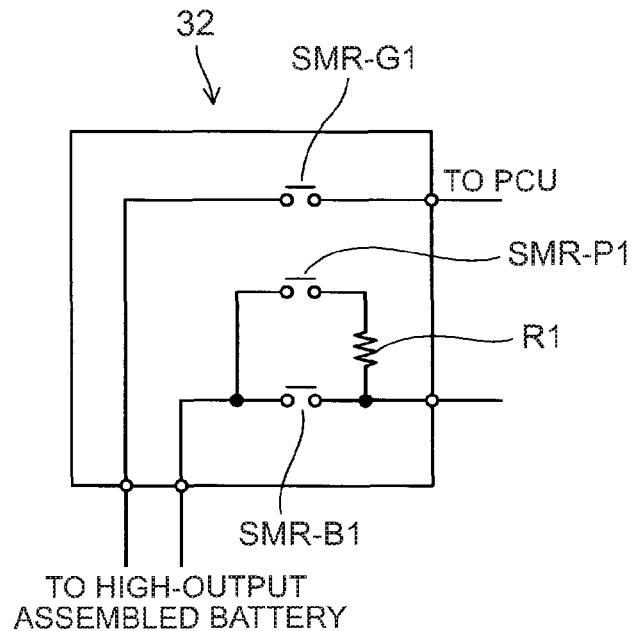
FIG. 2A is a drawing showing a configuration of a high-output junction box.
Figure 2B:
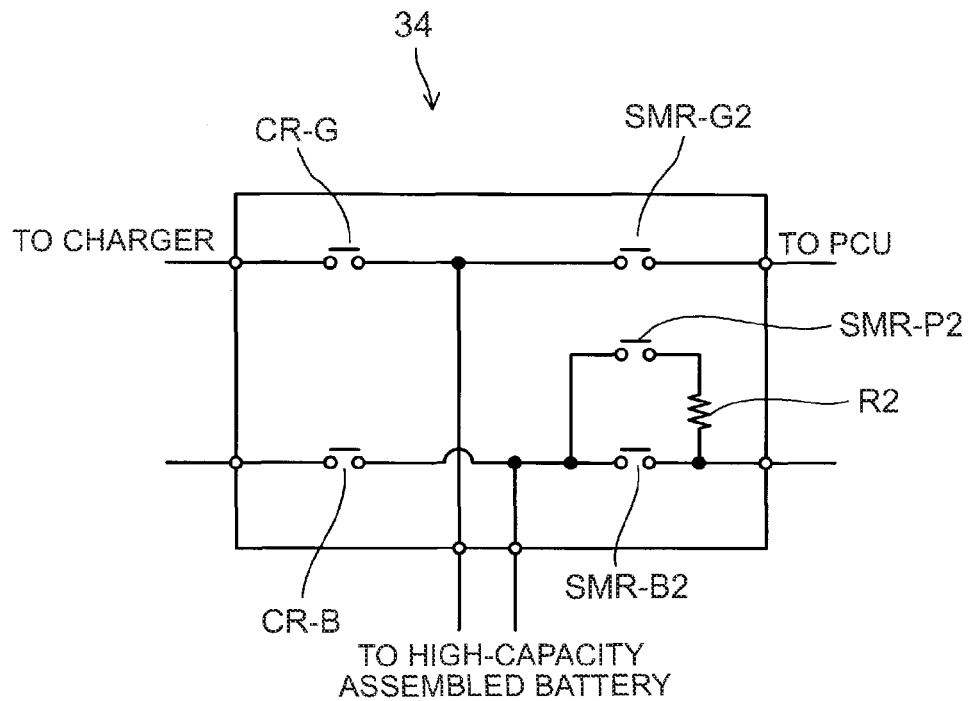
FIG. 2B is a drawing showing a configuration of a high-capacity junction box.

An electric motor vehicle that is an embodiment of the present invention will be described with reference to FIG. 1 and FIG. 2, hereinafter. FIG. 1 is a schematic view showing a configuration of a battery system installed in an electric motor vehicle. FIG. 2A and FIG. 2B are drawings respectively showing configurations of junction boxes 32, 34 as shown in FIG. 1. In FIG. 1, connections as shown in solid lines indicate electrical connections, and connections as shown in broken lines indicate mechanical connections.

The electric motor vehicle of the present embodiment is a hybrid vehicle having a motor generator 51 and an engine as a power source. The battery system includes a high-output assembled battery 10 and a high-capacity assembled battery 20 that are connected in parallel. The assembled batteries 10, 20 are housed along with the corresponding junction boxes 32, 34 in a single case 35, thereby configuring a battery pack 30.

The high-output assembled battery 10 is connected to a power control unit (electric power controller, referred to as a "PCU", hereinafter") 40 via system main relays SMR-G1, SMR-B1, SMR-P1 and a pre-charge resistance R1 that are provided in the junction box 32. The high-capacity assembled battery 20 is connected to the PCU 40 via system main relays SMR-G2, SMR-B2, SMR-P2 and a pre-charge resistance R2 that are provided in the junction box 34. The high-capacity assembled battery 20 is also connected to a charger 46 via charging relays CR-G and CR-B provided in the junction box 34.

The PCU 40 includes an inverter 44 and a DC/DC converter 42. The DC/DC converter 42 steps up a DC power supplied from each assembled battery 10, 20 or steps down a DC power generated by the motor generator 51 and outputted from the inverter 44. The inverter 44 converts the DC power supplied from each assembled battery 10, 20 into an AC power. The motor generator 51 (AC motor) is connected to the inverter 44, and the motor generator 51 receives the AC power supplied from the inverter 44, and generates kinetic energy for driving the vehicle. The motor generator 51 is connected to wheels 52. An engine 54 is connected to the wheels 52 so as to transmit the kinetic energy generated by the engine 54 to the wheels 52.

When the vehicle is decelerated or stopped, the motor generator 51 converts the kinetic energy generated by breaking of the vehicle into electric energy (AC power). The inverter 44 converts the AC power generated by the motor generator 51 into a DC power, and supplies this power to each assembled battery 10, 20. Through this configuration, the assembled batteries 10, 20 can store regenerated power. The motor generator 51 is unnecessary to be single, but multiple motor generators 51 may be provided.

The charger 46 converts electric power from an external AC power supply into charging power (DC power) with which the high-capacity assembled battery 20 is charged.

The charger 46 is connected to a charging inlet 48. The charging inlet 48 is disposed at a rearward position in a lateral surface of the vehicle, as described later, and a connector (so-called charging plug) of an AC power supply (e.g., commercial power supply) is plugged into the charging inlet 48.

The controller 50 outputs control signals respectively to the PCU 40 and the motor generator 51 so as to control driving thereof. The controller 50 outputs control signals respectively to the system main relays SMR-B1, B2, SMR-G1, G2, SMR-P1, P2, and the charging relays CR-G, CR-B so as to carry out switching between ON and OFF among these relays.

If the system main relays SMR-B1, SMR-G1, SMR-P1 are turned ON, charging and discharging of the high-output assembled battery 10 is permitted, and if the system main relays SMR-B1, SMR-G1, SMR-P1 are turned OFF, the charging and discharging of the high-output assembled battery 10 is prohibited. If the system main relays SMR-B2, SMR-G2, SMR-P2 are turned ON, charging and discharging of the high-capacity assembled battery 20 is permitted, and if the system main relays SMR-B2, SMR-G2, SMR-P2 are turned OFF, the charging and discharging of the high-capacity assembled battery 20 is prohibited. If the charging relays CR-G, CR-B are turned ON, the high-capacity assembled battery 20 is permitted to be externally charged, and if the charging relays CR-G, CR-B are turned OFF, the high-capacity assembled battery 20 is prohibited to be externally charged.

The vehicle according to the present embodiment includes, as a power source for driving the vehicle, not only the assembled batteries 10, 20 but also the engine 54. An example of the engine 54 may include an engine using gasoline, a diesel fuel, or a biofuel.

In the vehicle of the present embodiment example, the vehicle can be driven by using only the output from the high-output assembled battery 10 or the high-capacity assembled battery 20. This drive mode is referred to as an EV (electric vehicle) drive mode. For example, the vehicle can be driven by discharging the high-capacity assembled battery 20 until the state of charge (SOC) reaches approximately 0% from approximately 100%. After the SOC of the high-capacity assembled battery 20 reaches approximately 0%, the external power supply, for example, a commercial power supply is used to charge the high-capacity assembled battery 20.

In the EV drive mode, when a driver operates an acceleration pedal so that a requested output of the vehicle is increased, it is possible to drive the vehicle using not only the output from the high-capacity assembled battery 20 but also the output from the high-output assembled battery 10. By using the high-capacity assembled battery 20 together with the high-output assembled battery 10, it is possible to secure the battery output in accordance with the operation of the acceleration pedal, thereby enhancing drivability.

After the SOC of the high-capacity assembled battery 20 reaches approximately 0%, the vehicle can be driven by using the high-output assembled battery 10 along with the engine 54. This drive mode is referred to as an HV (hybrid vehicle) drive mode. In this HV drive mode, for example, charging and discharging of the high-output assembled battery 10 can be controlled in such a manner that the SOC of the high-output assembled battery 10 varies in accordance with a predetermined reference SOC.

If the SOC of the high-output assembled battery 10 is higher than the reference SOC, the high-output assembled battery 10 is discharged so as to approximate the SOC of the high-output assembled battery 10 to the reference SOC. If the SOC of the high-output assembled battery 10 is smaller than the reference SOC, the high-output assembled battery 10 is charged so as to approximate the SOC of the high-output assembled battery 10 to the reference SOC. In the HV drive mode, not only the high-output assembled battery 10 but also the high-capacity assembled battery 20 can be used. This means that the capacity of the high-capacity assembled battery 20 is allowed to remain, and the high-capacity assembled battery 20 can be discharged in the HV drive mode. It is also possible to store regenerative electric power in the high-capacity assembled battery 20.

As aforementioned, the high-capacity assembled battery 20 can mainly be used in the EV drive mode, and the high-output assembled battery 10 can mainly be used in the HV drive mode. Using the high-capacity assembled battery 20 mainly in the EV drive mode means the following two cases. First, it is meant that in the EV drive mode, the high-capacity assembled battery 20 has a higher usage frequency than that of the high-output assembled battery 10. Second, it is meant that when the high-capacity assembled battery 20 and the high-output assembled battery 10 are both used in the EV drive mode, in total electric power used for the vehicle driving, a percentage of an output electric power of the high-capacity assembled battery 20 is higher than a percentage of an output electric power of the high-output assembled battery 10. The total electric power does not denote an instantaneous electric power, but denotes electric power in a predetermined duration of driving time or in a predetermined driving distance.

Figure 3:
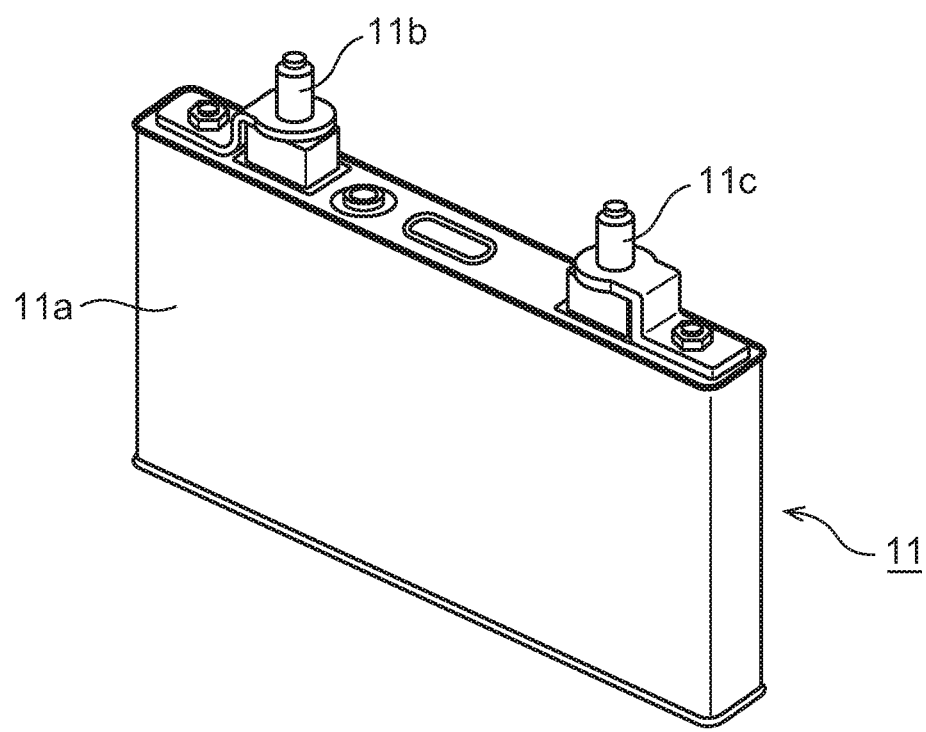
FIG. 3 is an outline view of a battery cell used in a high-output assembled battery.

As shown in FIG. 1, the high-output assembled battery 10 includes plural battery cells 11 connected in series. As the battery cells 11, secondary battery cells, such as nickel-hydrogen batteries and lithium-ion batteries may be used. The number of the battery cells 11 configuring the high-output assembled battery 10 may be appropriately defined in consideration of the required output of the high-output assembled battery 10. As shown in FIG. 3, the battery cell 11 is a so-called rectangle-shaped battery cell. A rectangle-shaped battery cell denotes a battery cell having an outer shape formed in accordance with a rectangular parallelepiped shape.

In FIG. 3, the battery cell 11 has a battery case 11a formed in a rectangular parallelepiped shape, and the battery case 11a houses therein a power generation element that carries out charging and discharging. The power generation element includes a positive electrode element, a negative electrode element, and a separator disposed between the positive electrode element and the negative electrode element. The separator contains an electrolytic solution. The positive electrode element includes a current collector, and positive electrode active substance layers formed on surfaces of the current collector. The negative electrode element includes a current collector, and negative electrode active substance layers formed on surfaces of the current collector.

A positive electrode terminal 11b and a negative electrode terminal 11c are arranged on a top surface of the battery case 11a. The positive electrode terminal 11b is electrically connected to the positive electrode element of the power generation element, and the negative electrode terminal 11c is electrically connected to the negative electrode element of the power generation element.

Figure 4:
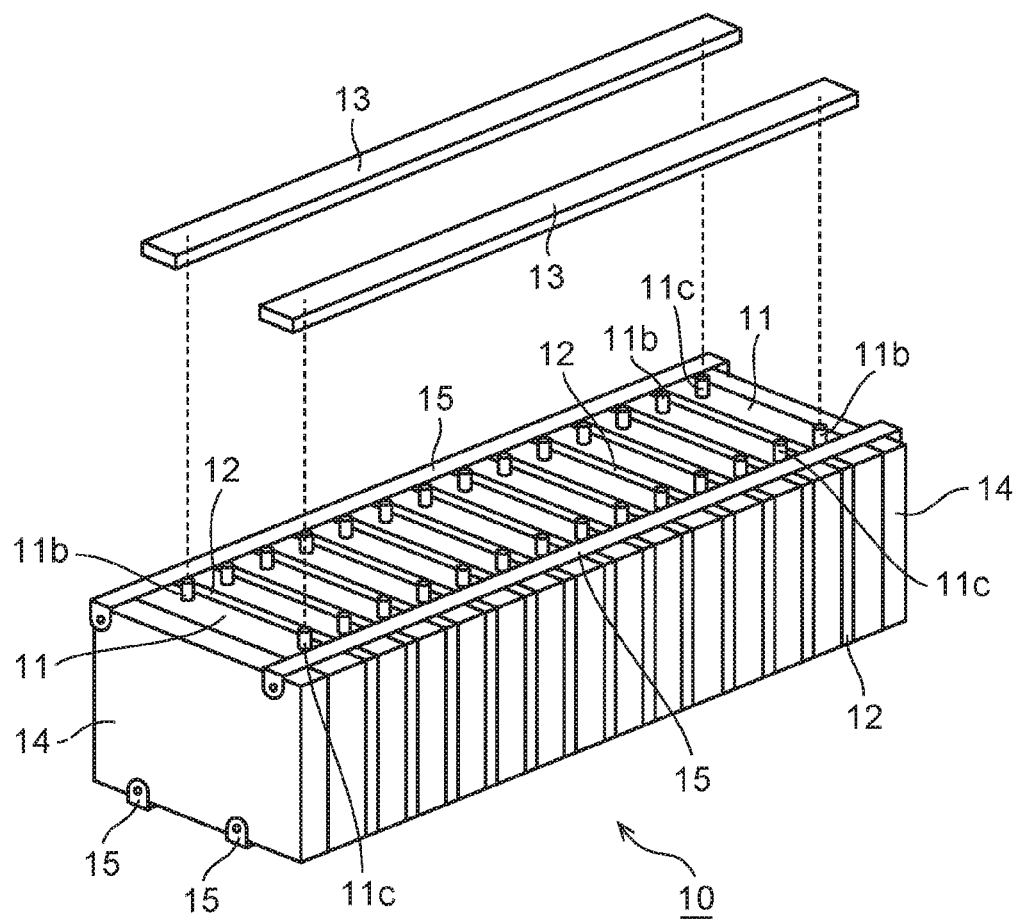
FIG. 4 is an outline view of the high-output assembled battery.

As shown in FIG. 4, in the high-output assembled battery 10, the plural battery cells 11 are arranged in line in one direction. A partition plate 12 is disposed between two adjacent battery cells 11. Each partition plate 12 may be formed by an isolation material, such as resin, so as to isolate each two adjacent battery cells 11 from each other.

Each partition plate 12 is so used as to form a space to the outer surface of each corresponding battery cell 11. Specifically, each partition plate 12 may be provided with projections projecting toward the corresponding battery cells 11. A front end of each projection is brought to be in contact with each corresponding battery cell 11, thereby forming a space between each partition plate 12 and each corresponding battery cell 11. Air used for temperature adjustment of each battery cell 11 can be moved through this space.

If the battery cells 11 generate heat during charging and discharging, or the like, a cooling air may be introduced into the spaces formed between the partition plates 12 and the battery cells 11. The cooling air is heat-exchanged with the battery cells 11, thereby suppressing increase in temperature of the battery cells 11. If the battery cells 11 are excessively cooled, a heating air may be introduced into the spaces formed between the partition plates 12 and the battery cells 11. The heating air is heat-exchanged with the battery cells 11, thereby suppressing decrease in temperature of the battery cells 11.

The plural battery cells 11 are electrically connected to one another in series by two bus bar modules 13. Each bus bar module 13 includes plural bus bars, and a holder holding the plural bus bars. Each bus bar is formed by an electric conductive material, and the positive electrode terminal 11b of one of each two adjacent battery cells 11 is connected to the negative electrode terminal 11c of the other battery cell 11. The holder is made of an isolation material, such as resin.

A pair of end plates 14 is disposed at both ends of the high-output assembled battery 10 in the arrangement direction of the plural battery cells 11. Fastening bands 15 extending in the arrangement direction of the plural battery cells 11 are connected to the pair of end plates 14. Through this, it is possible to apply a fastening force onto the plural battery cells 11. The fastening force denotes a force to hold the individual battery cells 11 from both sides in the arrangement direction of the plural battery cells 11. The fastening force is applied to the battery cells 11 so as to suppress expansion of the battery cells 11.

In the present embodiment example, two fastening bands 15 are arranged on a top surface of the high-output assembled battery 10, and two fastening bands 15 are arranged on a bottom surface of the high-output assembled battery 10. The number of the fastening bands 15 may be appropriately defined. Specifically, it is sufficient to apply a fastening force onto the battery cells 11 by using the fastening bands 15 and the end plates 14. Alternatively, no fastening force may be applied onto the battery cells 11, and the end plates 4 and the fastening bands 15 may be omitted.

In the present embodiment example, the plural battery cells 11 are arranged in one direction, but the present invention is not limited to this. For example, a single battery module may be formed by using the plural battery cells 11, and plural battery modules may be arranged in one direction.

Meanwhile, as shown in FIG. 1, the high-capacity assembled battery 20 includes plural battery blocks 21 connected in series. Each battery block 21 includes plural battery cells 22 connected in parallel. The number of the battery blocks 21, and the number of the battery cells 22 included in each battery block 21 are appropriately defined in consideration of the required output and the required capacity of the high-capacity assembled battery 20. In each battery block 21 of the present embodiment example, the plural battery cells 22 are connected in parallel, but the present invention is not limited to this. Specifically, plural battery modules in each of which plural battery cells 22 are connected in series are prepared, and the plural battery modules are connected in parallel, thereby configuring each battery block 21.

Figure 5:
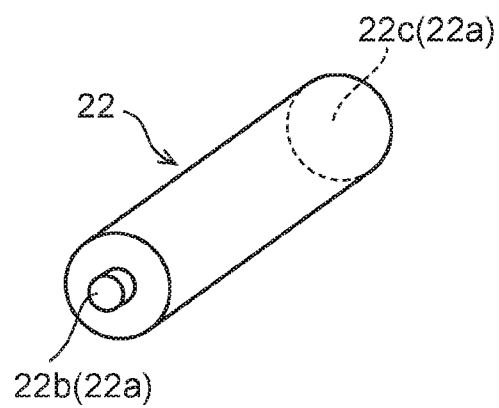
FIG. 5 is an outline view of a battery cell used in a high-capacity assembled battery.

As the battery cell 22, a secondary battery, such as a nickel-hydrogen battery and a lithium-ion battery, may be used. The battery cell 22 is a so-called cylindrical battery, as shown in FIG. 5. A cylindrical battery cell is a battery cell of which outer shape is formed in accordance with a cylinder.

As shown in FIG. 5, each cylindrical battery cell 22 includes a battery case 22a in a cylindrical shape. A power generation element is contained in each battery case 22a. Components of the power generation element of each battery cell 22 are the same as those of each battery cell 11.

A positive electrode terminal 22b and a negative electrode terminal 22c are provided at both longitudinal ends of each battery cell 22. The positive electrode terminal 22b and the negative electrode terminal 22c configure the battery case 22a. The positive electrode terminal 22b is electrically connected to the positive electrode element of the power generation element, and the negative electrode terminal 22c is electrically connected to the negative electrode element of the power generation element. Each battery cell 22 of the present embodiment example has a diameter of 18 [mm], and a length of 65.0 [mm], and is a so-called 18650-type battery. A battery cell 22 having a different dimension from that of the 18650-type battery cell 22 may also be used.

Figure 6:
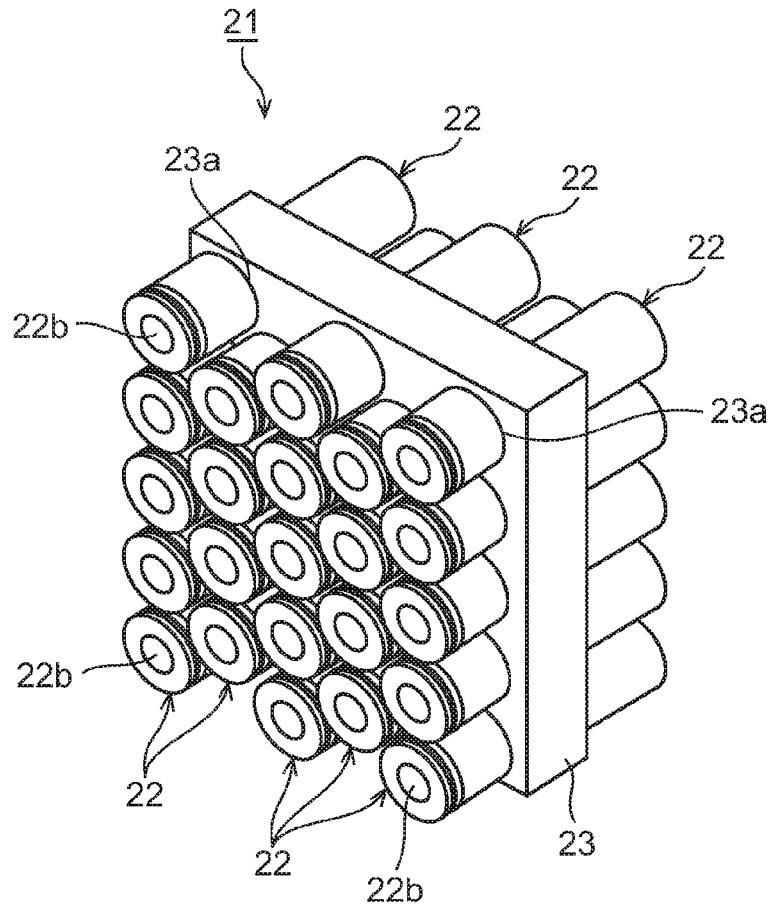
FIG. 6 is an outline view of a battery block used in the high-capacity assembled battery.

As shown in FIG. 6, each battery block 21 includes the plural battery cells 22 and a holder 23 holding the plural battery cells 22. The plural battery blocks 21 are arranged into the high-capacity assembled battery 20. The plural battery blocks 21 are connected in series via an electric cable or the like. The high-capacity assembled battery 20 is used for securing a driving distance in the EV drive mode, and many battery cells 22 are used therein. Hence, the dimension of the high-capacity assembled battery 20 is likely to be greater than the dimension of the high-output assembled battery 10.

The holder 23 has through-holes 23a each of which the battery cell 22 is inserted. The through-holes 23a are formed by the same number as that of the battery cells 22. The plural battery cells 22 are arranged in such a manner that the positive electrode terminals 22b (or the negative electrode terminals 22c) are located on the same side of the holder 23. The plural positive electrode terminals 22b are connected to a single bus bar, and the plural negative electrode terminals 22c are connected to a single bus bar. Through this configuration, the plural battery cells 22 are electrically connected in parallel.

In each battery block 21 of the present embodiment example, the single holder 23 is used, but plural holders 23 may also be used. For example, one of the holders 23 may be used to hold the positive electrode terminals 22b of the battery cells 22, and the other holder 23 may be used to hold the negative electrode terminals 22c of the battery cells 22.

Characteristics of each battery cell 11 used in the high-output assembled battery 10, and characteristics of each battery cell 22 used in the high-capacity assembled battery 20 will be described, hereinafter. Table 1 shows a comparative relation of the characteristics between the battery cells 11, 22. "High" and "Low" in Table 1 indicate a relation between the two battery cells 11, 22 if the battery cells 11, 22 are compared with each other. Specifically, "High" indicates a higher state compared with the battery cell as a comparison target, and "Low" indicates a lower state compared with the battery cell as the comparison target.

TABLE 1

|  | Battery Cell 11 (High-output type) | Battery cell 22 (High-capacity type) |
| --- | --- | --- |
| Output Density | High | Low |
| Power Capacity Density | Low | High |
| Temperature-dependency of I/O | Low | High |
| Temperature-dependency of Battery Life Duration | Low | High |

The output density of the battery cell 11 is higher than the output density of the battery cell 22. For example, the output density of each battery cell 11, 22 may be represented in terms of electric power per unit mass (unit [W/kg]) of the battery cell, or in terms of electric power per unit volume (unit [W/L]) of the battery cell. If the mass or the volume of the battery cell 11 is equalized to that of the battery cell 22, the output [W] of the battery cell 11 should be higher than the output [W] of the battery cell 22.

The output density of the electrode element (the positive electrode element or the negative electrode element) of each battery cell 11, 22 may be represented in terms of a current value per unit area (unit [mA/cm$^2$]) of the electrode element. The output density of the electrode element of the battery cell 11 is higher than that of the electrode element of the battery cell 22. If the area of each electrode element is equalized between the battery cell 11 and the battery cell 22, a current value suppliable to the electrode element of the battery cell 11 is greater than a current value suppliable to the electrode element of the battery cell 22.

The power capacity density of the battery cell 22 is higher than the power capacity density of the battery cell 11. The power capacity density of each battery cell 11, 22 may be represented in terms of a capacity per unit mass (unit [Wh/kg]) of the battery cell or a capacity per unit volume (unit [Wh/L]) of the battery cell, for example. If the mass or the volume of each electrode element is equalized between the battery cell 11 and the battery cell 22, the power capacity [Wh] of the battery cell 22 is greater than the power capacity [Wh] of the battery cell 11.

The capacity density of the electrode element of each battery cell 11, 22 may be represented in terms of a capacity per unit mass (unit [mAh/g]) of the electrode element, or a capacity per unit volume of the electrode element (unit [mAh/cc]), for example. The capacity density of the electrode element of the battery cell 22 is higher than that of the battery cell 11. If the mass or the volume of each electrode element is equalized between the battery cell 11 and the battery cell 22, the capacity of the electrode element of the battery cell 22 is greater than the capacity of the electrode element of the battery cell 11.

Figure 7:
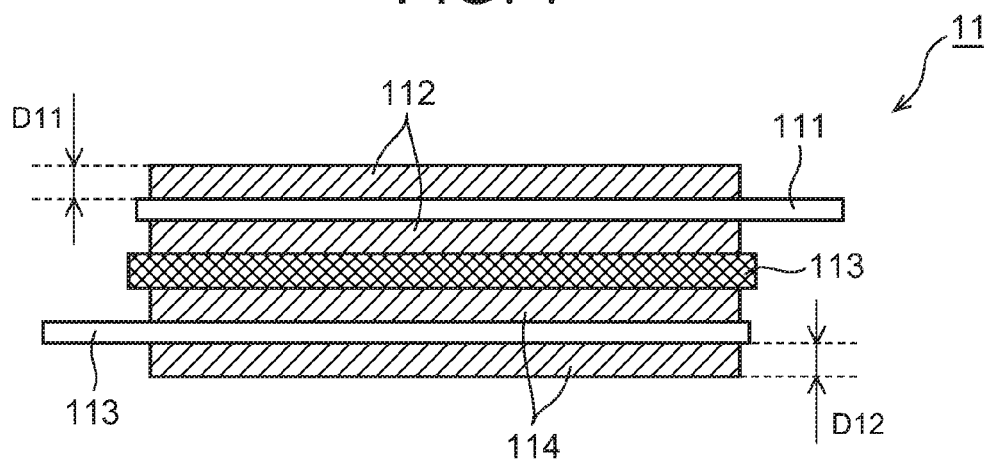
FIG. 7 is a drawing showing a configuration of a power generation element used in the battery cell of the high-output assembled battery.
Figure 8:
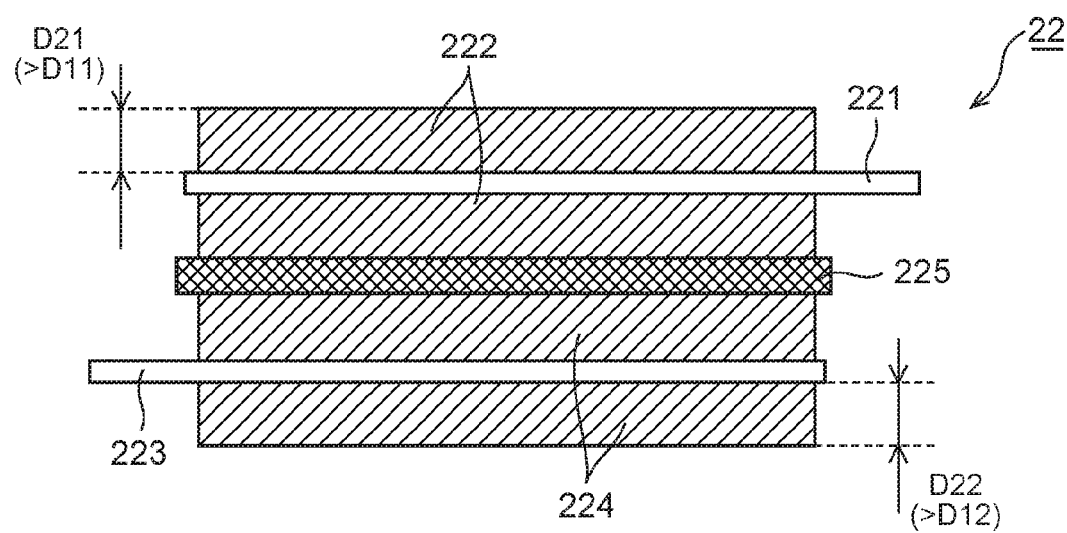
FIG. 8 is a drawing showing a configuration of a power generation element used in the battery cell of the high-capacity assembled battery.

FIG. 7 is a schematic view showing a configuration of the power generation element of each battery cell 11, and FIG. 8 is a schematic view showing a configuration of the power generation element of each battery cell 22.

In FIG. 7, the positive electrode element configuring the power generation element of each battery cell 11 includes a current collector 111 and active substance layers 112 formed on both surfaces of the current collector 111. If the battery cell 11 is a lithium-ion secondary battery, as a material of the current collector 111, aluminum may be used, for example. Each active substance layer 112 includes a positive electrode active substance, an electrically conducting material, a binder, and others.

The negative electrode element configuring the power generation element of each battery cell 11 includes a current collector 113, and active substance layers 114 formed on both surfaces of the current collector 113. If the battery cell 11 is a lithium-ion secondary battery, as a material of the current collector 113, copper may be used, for example. Each active substance layer 114 includes a negative electrode active substance, an electrically conducting material, a binder, and others.

A separator 115 is disposed between the positive electrode element and the negative electrode element, and the separator 115 is in contact with the active substance layer 112 of the positive electrode element and with the active substance layer 114 of the negative electrode element. The positive electrode element, the separator 115, and the negative electrode element are laminated in this order into a laminated body, and this laminated body is wound into the power generation element.

In the present embodiment example, the active substance layers 112 are formed on the both surfaces of the current collector 111, and the active substance layers 114 are formed on the both surfaces of the current collector 113, but the present invention is not limited to this. Specifically, a so-called bipolar electrode may be used. In the bipolar electrode, the positive electrode active substance layer 112 is formed on one surface of the current collector, and the negative electrode active substance layer 114 is formed on the other surface of the current collector. Plural bipolar electrodes are laminated with the separator interposed therebetween, thereby configuring the power generation element.

In FIG. 8, the positive electrode element configuring the power generation element of each battery cell 22 includes a current collector 221, and active substance layers 222 formed on both surfaces of the current collector 221. If the battery cell 22 is a lithium-ion secondary battery, as a material of the current collector 221, aluminum may be used, for example. The active substance layer 222 includes a positive electrode active substance, an electrically conducting material, a binder, and others.

The negative electrode element configuring the power generation element of each battery cell 22 includes a current collector 223, and active substance layers 224 formed on both surfaces of the current collector 223. If the battery cell 22 is a lithium-ion secondary battery, as a material of the current collector 223, copper may be used, for example. The active substance layer 224 includes a negative electrode active substance, an electrically conducting material, a binder, and others. A separator 225 is disposed between the positive electrode element and the negative electrode element, and the separator 225 is in contact with the active substance layer 222 of the positive electrode element and with the active substance layer 224 of the negative electrode element.

As shown in FIG. 7 and FIG. 8, if the respective positive electrode elements of the battery cell 11 and the battery cell 22 are compared with each other, a thickness D11 of the active substance layer 112 is thinner than a thickness D21 of the active substance layer 222. If the respective negative electrode elements of the battery cell 11 and the battery cell 22 are compared with each other, a thickness D12 of the active substance layer 114 is thinner than a thickness D22 of the active substance layer 224. The thicknesses D11, D12 of the active substance layers 112, 114 are thinner than the thicknesses D21, D22 of the active substance layers 222, 224, thereby facilitating current flow between the positive electrode element and the negative electrode element in each battery cell 11. Accordingly, the output density of each battery cell 11 becomes higher than the output density of each battery cell 22.

Figure 9:
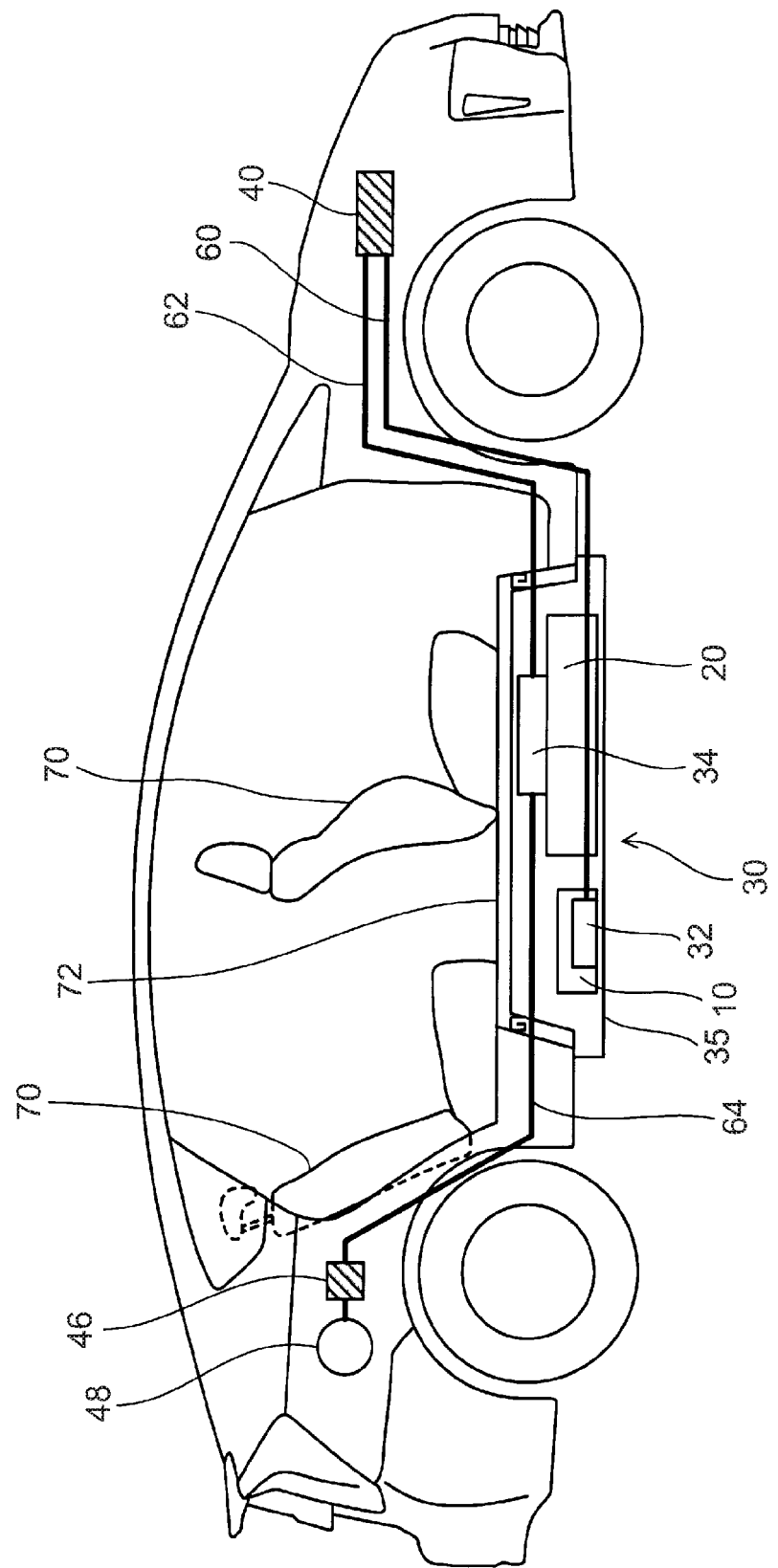
FIG. 9 is a schematic side view of a vehicle.
Figure 10:
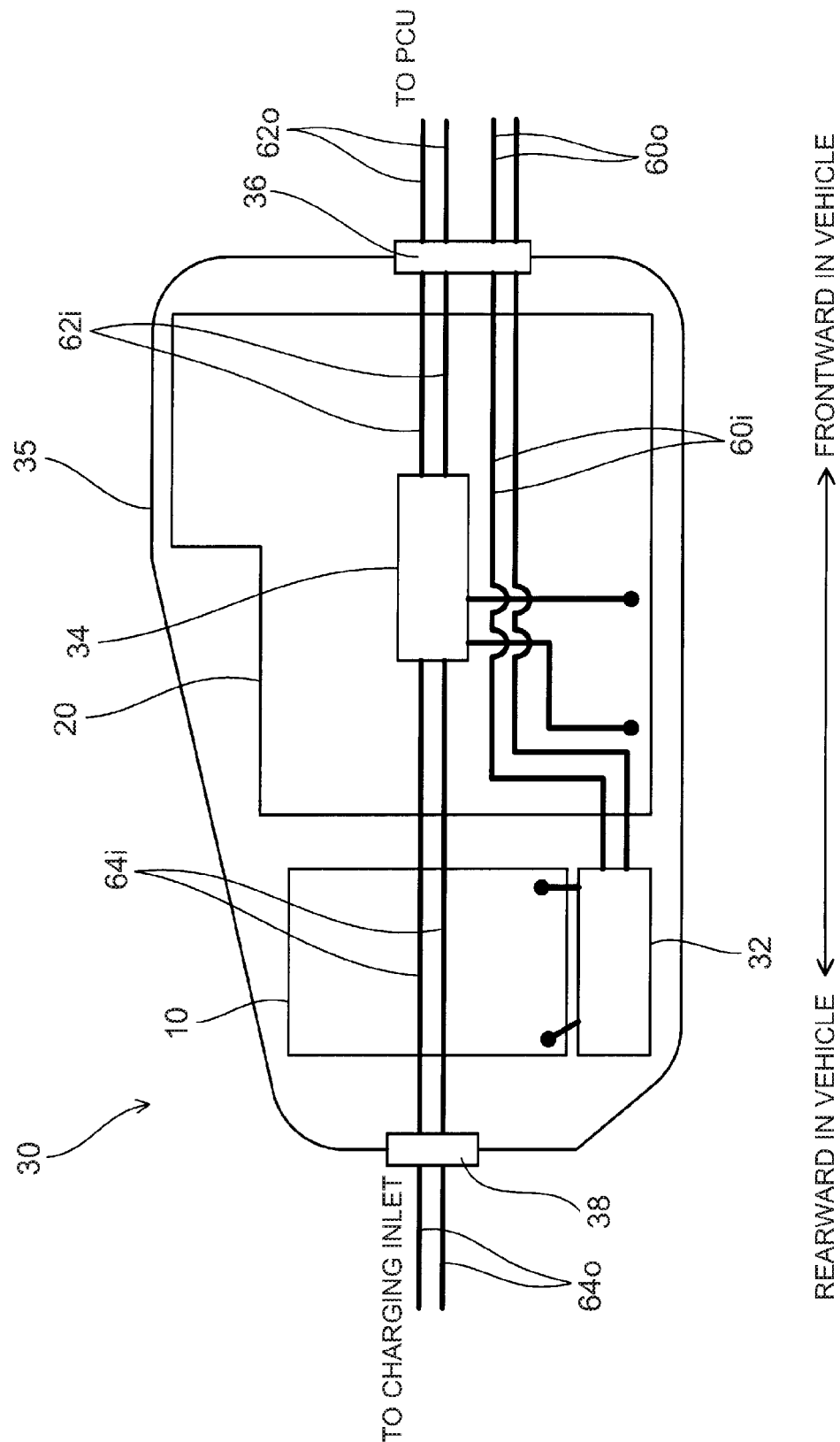
FIG. 10 is a drawing showing arrangements of the high-output assembled battery and the high-capacity assembled battery in a battery pack.

The arrangements and wiring of the high-output assembled battery 10 and the high-capacity assembled battery 20 when these assembled batteries are installed in the vehicle will be described with reference to FIG. 9 and FIG. 10. FIG. 9 is a schematic side view of the vehicle, and FIG. 10 is a drawing showing the arrangements of the high-output assembled battery 10 and the high-capacity assembled battery 20 in the battery pack 30.

As aforementioned, the vehicle according to the present embodiment includes the assembled batteries of two types, that is, the high-output assembled battery 10 and the high-capacity assembled battery 20. In the present embodiment, the high-output assembled battery 10 and the high-capacity assembled battery 20 are housed in the single case 35, thereby configuring the single battery pack 30. The case 35 of the battery pack 30 is made of a material of resin, aluminum, or the like, and the shape thereof may freely be changed depending on the relation with peripheral members, the dimensions of the assembled batteries 10, 20 of two types, and others. As shown in FIG. 10, a PCU-connection terminal 36 to be electrically connected to the PCU 40 is provided to one end of the case 35. A charger-connection terminal 38 to be electrically connected to the charger 46 is provided to the other end of the case 35. High-voltage wire harnesses are connected to these terminals 36, 38 so as to electrically connect each assembled battery 10, 20 to the PCU 40 and the charger 46.

The high-output assembled battery 10, the high-capacity assembled battery 20, the high-output junction box 32, the high-capacity junction box 34 are disposed inside the case 35. In the present embodiment, the high-output junction box 32 is disposed lateral to the high-output assembled battery 10, and the high-capacity junction box 34 is placed on the high-capacity assembled battery 20.

In this manner, the assembled batteries 10, 20 of two types are housed in the single case 35 to be packed, thus significantly reducing labors of installation and maintenance of these assembled batteries. Specifically, in the conventional case of installing the assembled batteries 10, 20 of two types, the high-output assembled battery 10 and the high-capacity assembled battery 20 are often configured as individual battery packs that are separate from each other. The battery packs of two types are arranged in different places from each other. For example, the battery pack including the high-output assembled battery 10 is disposed in a language space, and the battery pack including the high-capacity assembled battery 20 is disposed under a seat 70. In this configuration, if the high-output assembled battery 10 and the high-capacity assembled battery 20 are installed in the vehicle, it is necessary to separately install these assembled batteries; and in the case of carrying out maintenance of each electric system, it is necessary to access to different two points of these batteries, which results in a tedious labor. To the contrary, as with the present embodiment, in the case of collectively housing the assembled batteries 10, 20 of two types into the single battery pack 30, it is possible to significantly reduce a labor of the installation and a labor of the maintenance.

However, in the case of collectively housing the assembled batteries 10, 20 of two types in the single battery pack 30, an installation space with a moderate volume is required compared with the case of separately installing the assembled batteries 10, 20 of two types. It is difficult to secure an installation space with a moderate volume in the luggage space or under the seat. To cope with this difficulty, in the present embodiment, as shown in FIG. 9, the battery pack 30 is placed under a floor panel 72 at a center position in the longitudinal direction of the vehicle. The floor panel 72 is a panel configuring a floor surface of a vehicle cabin. The battery pack 30 is fixed to an outer bottom surface of the floor panel 72. A space with a moderate volume can be secured more easily below the floor panel 72, that is, outside the bottom surface of the vehicle cabin, compared with the luggage space or the space under the seat. Hence, it is possible to install even the battery pack 30 having a relatively large dimension. In particular, it has recently been demanded to further increase a cruising distance, and in order to meet such a demand, there are requested further increase in battery capacity as well as further increase in dimension of the battery pack 30. If the battery pack 30 is disposed outside the bottom surface of the vehicle cabin, it is possible to sufficiently satisfy such a request of increase in dimension of the battery pack 30. If the battery pack 30 with a heavy weight is disposed to the outside of the bottom surface of the floor panel 72, that is, disposed to the lower part of the vehicle, the center of gravity of the entire vehicle becomes lowered. As a result, it is possible to enhance stability of the vehicle during driving.

Each assembled battery 10, 20 is electrically connected to the PCU 40 and the charging inlet 48 via the high-voltage wire harness (electrical wiring). Hereinafter, an electrical wiring that connects the high-output assembled battery 10 to the PCU 40 is referred to as a "first wiring 60", an electrical wiring that connects the high-capacity assembled battery 20 to the PCU 40 is referred to as a "second wiring 62", and an electrical wiring that connects the high-capacity assembled battery 20 to the charging inlet is referred to as a "charging wiring 64". In the present embodiment, the second wiring 62 that connects the high-capacity assembled battery 20 to the PCU 40 is set to be shorter than the first wiring 60 that connects the high-output assembled battery 10 to the PCU 40.

To be more specific, the first wiring 60 is configured by a first internal wiring 60i that connects an I/O (input/output) terminal (not shown) of the high-output assembled battery 10 to the PCU-connection terminal 36, and a first external wiring 60o that connects the PCU-connection terminal 36 to the PCU 40. Similarly, the second wiring 62 is configured by a second internal wiring 62i that connects an I/O terminal (not shown) of the high-capacity assembled battery 20 to the PCU-connection terminal 36, and a second external wiring 62o that connects the PCU-connection terminal 36 to the PCU 40. Herein, the first internal wiring 60i and the second internal wiring 62i are drawn from the respective I/O terminals of the corresponding assembled batteries 10, 20, and extend via the corresponding junction boxes 32, 34 to the PCU-connection terminal 36.

Basically, both the first external wiring 60o and the second external wiring 62o that extend to the outside of the battery pack 30 have substantially the same length. Meanwhile, the lengths of the first internal wiring 60i and the second internal wiring 62i that are disposed inside the battery pack 30 become different from each other depending on the respective arrangements of the assembled batteries 10, 20 of two types. In the present embodiment, as shown in FIG. 10, the location of the high-capacity assembled battery 20 is set to be closer to the PCU-connection terminal 36 than the location of the high-output assembled battery 10 so as to set the second internal wiring 62i to be shorter than the first internal wiring 60i. Through this configuration, the second wiring 62 becomes shorter than the first wiring 60.

The reason for employing this configuration is as follows. In the present embodiment, as aforementioned, the high-output assembled battery 10 is used only during the HV drive and in a condition in which the SOC of the high-capacity assembled battery 20 becomes excessively deceased, and the high-capacity assembled battery 20 is used in the other conditions. Hence, in the whole electric power transmitted and received by the PCU 40, a percentage of electric power transmitted and received between the PCU 40 and the high-capacity assembled battery 20 is greater than a percentage of electric power transmitted and received between the PCU 40 and the high-output assembled battery 10. In such a vehicle, in order to reduce the electric power transmission loss caused in the entire vehicle, it is more effective to reduce the electric power transmission resistance of the second wiring 62 that connects the PCU 40 to the high-capacity assembled battery 20 than to reduce the electric power transmission resistance of the first wiring 60 that connects the PCU 40 to the high-output assembled battery 10. In order to reduce the electric power transmission resistance, it is effective to increase a sectional area of the wiring or reduce a distance of the wiring. However, increase in sectional area of the wiring causes increase in cost or deterioration of handling of the wiring, and thus this solution is difficult to be easily employed. To cope with this, in the present embodiment, in order to reduce the electric power transmission resistance of the second wiring 62 without causing increase in cost, the second wiring 62 is set to be shorter than the first wiring 60, thereby reducing the electric power transmission resistance thereof. Accordingly, through this configuration, it is possible to reduce the electric power transmission resistance without causing increase in cost.

As with the present embodiment, if the PCU 40 is arranged at a frontward position in the vehicle, and the charging inlet 48 is arranged at a rearward position in the vehicle, and furthermore, if the high-capacity assembled battery 20 is disposed more frontward in the vehicle than the high-output assembled battery 10, the electric power transmission resistance between the high-capacity assembled battery 20 and the PCU 40 can be reduced, but the electric power transmission resistance between the high-capacity assembled battery 20 and the charging inlet 48 (as well as the external power supply) cannot be reduced. However, in general, electric power transmitted and received between the high-capacity assembled battery 20 and the PCU 40 is greater than electric power transmitted and received between the high-capacity assembled battery 20 and the charging inlet 48. Hence, even if the electric power transmission resistance between the high-capacity assembled battery 20 and the charging inlet 48 becomes increased to some extent (i.e., the charging wiring 64 becomes longer to some extent), the electric power transmission loss of the entire vehicle can be reduced by reducing the electric power transmission resistance between the high-capacity assembled battery 20 and the PCU 40 (i.e., by setting the second wiring 62 to be shorter).

Figure 11:
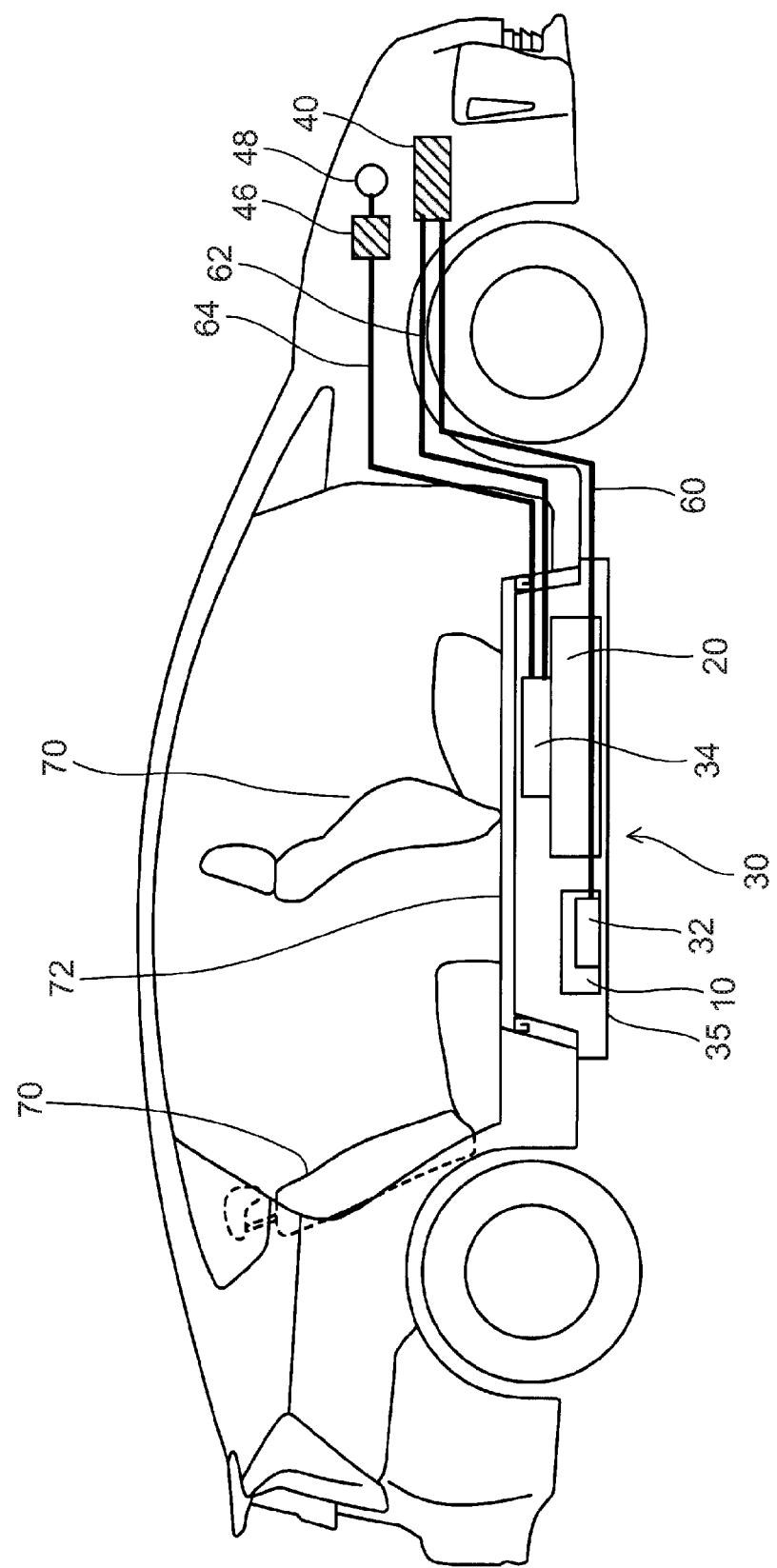
FIG. 11 is a schematic side view of another vehicle.
Figure 12:
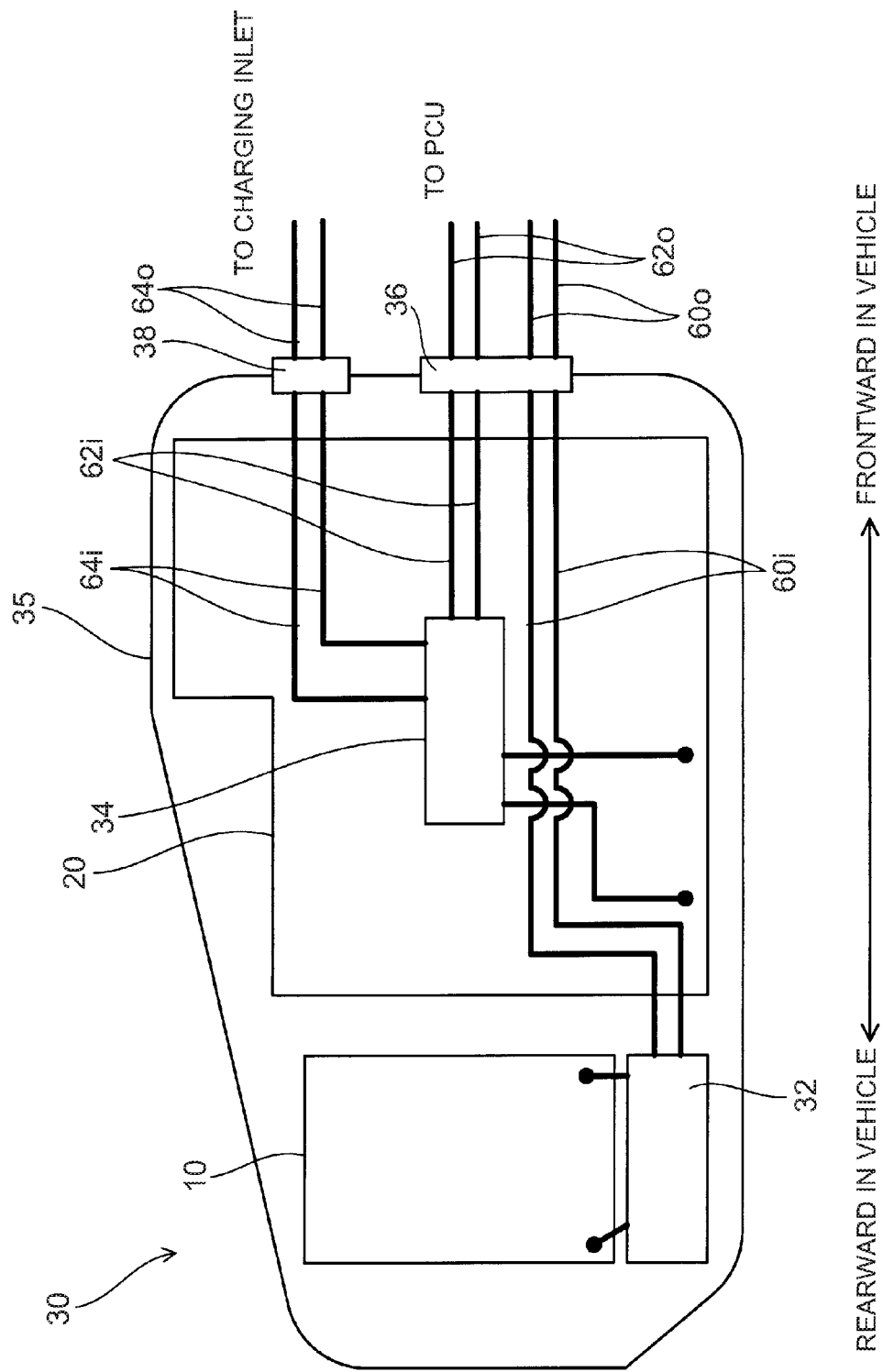
FIG. 12 is a drawing showing arrangements of the high-output assembled battery and the high-capacity assembled battery in another battery pack.

In order to reduce not only the electric power transmission loss between the high-capacity assembled battery 20 and the PCU 40 but also the electric power transmission loss between the high-capacity assembled battery 20 and the charging inlet 48, as shown in FIG. 11, the charging inlet 48 may be disposed on the same side of the PCU 40, that is, at a frontward position in the vehicle, and furthermore, as shown in FIG. 12, the charger-connection terminal 38 may be disposed at a front end of the battery pack 30. This configuration enables the second wiring 62 as well as the charging wiring 64 to be shorter, thus further reducing the electric power transmission loss of the entire vehicle.

As aforementioned, the second wiring 62 is set to be shorter than the first wiring 60, thereby reducing the loss of the electric power transmission of the entire vehicle. The above-described configuration is an example, and the other configurations may appropriately be changed as far as the second wiring 62 can be shorter than the first wiring 60.

For example, in the present embodiment, the high-output assembled battery 10 and the high-capacity assembled battery 20 are packed into one unit, but it is unnecessary to pack the assembled batteries 10, 20 of two types into one unit. For example, the assembled batteries 10, 20 of two types may be configured into individual battery packs. In this case, the location of the battery pack including the high-capacity assembled battery 20 is set to be closer to the PCU 40 than the location of the battery pack including the high-output assembled battery 10 so that the second wiring 62 that connects the high-capacity assembled battery 20 and the PCU 40 becomes shorter than the first wiring 60 that connects the high-output assembled battery 10 and the PCU 40.

In the present embodiment, the PCU 40 is disposed in the engine room located at a frontward position in the vehicle, but the PCU 40 may be disposed at another position, for example, at a rearward position in the vehicle, or the like. In this case, the high-capacity assembled battery 20 is disposed more rearward in the vehicle than the high-output assembled battery 10 so that the second wiring 62 that connects the high-capacity assembled battery 20 and the PCU 40 becomes shorter than the first wiring 60 that connects the high-output assembled battery 10 and the PCU 40.

The assembled batteries 10, 20 of two types may be arranged not in a longitudinal direction but in a vertical direction or in a lateral direction. Specifically, if the PCU 40 is located more upward than the battery pack 30, the high-capacity assembled battery 20 may be disposed more upward than the high-output assembled battery 10 so that the second wiring 62 that connects the high-capacity assembled battery 20 and the PCU 40 becomes shorter than the first wiring 60 that connects the high-output assembled battery 10 and the PCU 40. If the PCU 40 is located more rightward (or more leftward) than the battery pack 30, the high-capacity assembled battery 20 may be disposed more rightward (or more leftward) than the high-output assembled battery 10 so that the second wiring 62 becomes shorter than the first wiring 60.

The present embodiment has been described by using the example of the plug-in hybrid vehicle that includes an engine and is externally chargeable, but the technique of the present embodiment may be applicable to any other vehicle, such as an electric vehicle including no engine, for example, as far as the vehicle is an electric motor vehicle including the assembled batteries 10, 20 of two types.

What is claimed is:

1. An electric motor vehicle comprising:
a high-output battery;
a high-capacity battery having a larger capacity and a smaller output than a capacity and an output of the high-output battery;
an electric power controller that includes an inverter, the electric power controller being configured to transmit and receive electric power to and from the high-output battery and the high-capacity battery;
a first wiring that connects the high-output battery to the electric power controller;
a second wiring that connects the high-capacity battery to the electric power controller, the second wiring being shorter than the first wiring; and
a charging wiring that connects the high-capacity battery to a charging inlet,
wherein the high-capacity battery and the high-output battery are disposed under a floor panel of the vehicle while the high-capacity battery and the high-output battery are housed in an identical case,
wherein a location of the high-capacity battery is closer to the electric power controller than a location of the high-output battery,
wherein the electric power controller, the high-capacity battery, and the high-output battery are disposed in this order in one direction, and
wherein the charging inlet is disposed on a same side of the vehicle as the electric power controller.

2. The electric motor vehicle according to claim 1, wherein
at least a portion of the electric power which is transmitted and received from the high-output battery and the high-capacity battery is used for driving the electric motor vehicle,
wherein of this portion of the electric power, a higher percentage of said portion of electric power is outputted from the high-capacity battery than from the high-output battery.

3. The electric motor vehicle according to claim 1, wherein
the electric power controller is disposed more frontward than a vehicle cabin, and the high-capacity battery is disposed more frontward than the high-output battery in the case.

4. The electric motor vehicle according to claim 3, wherein
the electric power controller is provided outside the case,
the electric motor vehicle comprises a first terminal that is electrically connected to the electric power controller and a second terminal that is electrically connected to a charger, and
the first terminal and the second terminal are disposed at a front end of the case.

* * * * *